(12) United States Patent
Kim et al.

(10) Patent No.: US 7,481,553 B2
(45) Date of Patent: Jan. 27, 2009

(54) BACKLIGHT ASSEMBLY AND LIQUID CRYSTAL DISPLAY MODULE USING THE SAME

(75) Inventors: Yong Kim, Seoul (KR); Nam-Su Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 104 days.

(21) Appl. No.: 11/639,178

(22) Filed: Dec. 15, 2006

(65) Prior Publication Data

US 2007/0297163 A1 Dec. 27, 2007

(30) Foreign Application Priority Data

Jun. 26, 2006 (KR) ...................... 10-2006-0057497

(51) Int. Cl.
*F21V 23/00* (2006.01)

(52) U.S. Cl. .................. 362/240; 362/800; 362/249; 362/238

(58) Field of Classification Search ......... 362/612–613, 362/97, 219, 561, 800, 240, 231, 249, 630–632, 362/238; 349/61, 68–69; 174/260, 261, 174/262

See application file for complete search history.

(56) References Cited

U.S. PATENT DOCUMENTS

| 4,709,307 | A | * | 11/1987 | Branom | 362/103 |
| 6,045,240 | A | * | 4/2000 | Hochstein | 362/294 |
| 2006/0279671 | A1 | * | 12/2006 | Han et al. | 349/61 |
| 2006/0289201 | A1 | * | 12/2006 | Kim et al. | 174/261 |

* cited by examiner

*Primary Examiner*—Jong-Suk (James) Lee
*Assistant Examiner*—Robert May
(74) *Attorney, Agent, or Firm*—Morgan Lewis & Bockius LLP

(57) ABSTRACT

A backlight assembly includes a plurality of light emitting diode units, each of the plurality of light emitting diode units including at least one light emitting diode and a printed circuit board mounting the at least one light emitting diode, and a reflective sheet on the printed circuit board, the reflective sheet having at least one hole corresponding to the at least one light emitting diode, such that the at least one light emitting diode is exposed through the hole, wherein the plurality of light emitting diode units are spaced apart and are electrically connected to each other via at least one line extending from the printed circuit board, the at least one line is bent toward a predetermined direction.

15 Claims, 4 Drawing Sheets

BACKLIGHT ASSEMBLY AND LIQUID CRYSTAL DISPLAY MODULE USING THE SAME

The present invention claims the benefit of Korean Patent Application No. P2006-0057497, filed in Korea on Jun. 26, 2006, which is hereby incorporated by reference.

BACKGROUND OF THE INVENTION

1. Field of the Invention

The present invention relates to a backlight assembly, and more particularly, to a backlight assembly including at least one light emitting diode (LED) as a light source and a liquid crystal display (LCD) module using the backlight assembly.

2. Discussion of the Related Art

Recently, flat panel display (FPD) devices that have the advantage of light weight, thin profile, and low power consumption have been commonly utilized as substitutes for cathode ray tube (CRT) devices. In general, display devices may be classified, depending on the abilities for self-emission, into emissive display devices and non-emissive display devices. The emissive display devices display images by self-emitting light, whereas the non-emissive display devices require a light source because they do not emit light by themselves. For example, plasma display panel (PDP) devices, field emission display (FED) devices, and electroluminescent display (ELD) devices are commonly utilized as emissive display devices. Liquid crystal display (LCD) devices may be regarded as non-emissive display devices although some applications do not require a light source. The LCD devices are usually installed in notebook and desktop computers because of their high resolutions, color display capabilities, and high quality images.

The LCD device includes an LCD module consisting of an LCD panel for displaying images and a backlight assembly for supplying light to the LCD panel. In general, the backlight assembly may be regarded as either side-type backlight assembly or direct-type backlight assembly depending to the disposition of the light source. With the great demand for the LCD device having a large display screen, the direct-type backlight assembly including a plurality of light sources has become more popular to provide more light. The light source of the backlight assembly may be discharge lamps, such as cold cathode fluorescent lamps (CCFL), external electrode fluorescent lamps (EEFL), and the like. Recently, the light emitting diode (LED) has been widely utilized as the light source for the backlight assembly to improve color reproducibility and to increase display brightness.

FIG. 1 is a schematic exploded perspective view of an LCD module 1 according to the related art. As shown in FIG. 1, the related art LCD module 1 includes an LCD panel 10 that includes two substrates (not shown) facing each other and a liquid crystal layer (not shown) interposed between the two substrate, a gate printed circuit board (PCB) 18 and a source PCB 16 arranged respectively at the edges of the LCD panel 10, a backlight assembly 20 arranged under the LCD panel 10, a main frame 40 surrounding the LCD panel 10 and the backlight assembly 20, a bottom frame 50 arranged under the backlight assembly 20 and combined with the main frame 40, and a top frame 60 covering the LCD panel 10 and combined with the main frame 40 and the bottom frame 50.

The backlight assembly 20 includes a plurality of PCBs 22 on an inner surface of the bottom frame 50. Here, the plurality of PCBs 22 are disposed in a row and spaced apart from each other. Moreover, each row of PCBs 22 is provided with a plurality of LEDs 24 arranged in a row. In other words, the row of PCBs 22 including the plurality of LEDs 24 is repeatedly disposed on the bottom frame 50. The backlight assembly 20 also includes a reflective sheet 26 disposed on the PCBs 22, the LEDs 24, and the inner surface of the bottom frame 50. Specifically, the reflective sheet 26 is formed with a plurality of holes 28 corresponding to the respective LEDs 24. The LEDs 24 pass through the holes 28, thereby being exposed from the reflective sheet 26. Here, the PCB 22 is connected to a backlight driving circuit (not shown) and signals from the backlight driving circuit is applied to the LEDs 24 through a thin film line (not shown) on the PCB 22 so that the LEDs 24 are able to emit red, green and blue light. Therefore, a white light is obtained by uniformly mixing the red, green and blue light.

The backlight assembly 20 also includes a transparent window 30 disposed on the reflective sheet 26. The transparent window 30 is formed with a plurality of diverters 31 corresponding to the respective LEDs 24. Moreover, a diffusion plate 32 for creating uniform brightness is disposed on the transparent window 30. An optical sheet group 34 is disposed on the diffusion plate 32 such that the optical sheet group 34 consisting of a plurality of optical sheets are sequentially layered. When light from the LEDs 24 is emitted directly or by reflective sheet 26, the red, green and blue color lights are uniformly mixed. The uniformly mixed light has uniform brightness by the diffusion plate 32, and then the light is incident into the LCD panel 10 after passing through the optical sheet group 34, thereby displaying a desired image.

However, there is a structural limitation in the related art. Each row of PCBs 22 is formed with the plurality of LEDs 24 disposed thereon to emit a predetermined color, which depends on that row of PCBs 22 to drive the LEDs 24. If only a few of the LEDs 24 are defective, it is difficult to selectively replace the defective LEDs 24, and the whole row of PCBs 22 with the defective LEDs 24 has to be replaced with a new one. As a result, many non-defective LEDs 24 on the PCBs 22 are wasted, thereby lowering productivity and increasing the product costs.

SUMMARY OF THE INVENTION

Accordingly, the present invention is directed to a backlight assembly and an LCD module using the backlight assembly that substantially obviate one or more of the problems due to limitations and disadvantages of the related art.

An object of the present invention is to provide a backlight assembly and an LCD module using the backlight assembly, in which LEDs are arranged in each LED unit so that LEDs are selectively repaired and replaced.

Another object of the present invention is to provide a backlight assembly and an LCD module using the backlight assembly with improved productivity and reduced production costs.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the backlight assembly including a plurality of light emitting diode units, each of the plurality of light emitting diode units including at least one light emitting diode and a printed circuit board mounting the at least one light emitting diode, a reflective sheet on the printed circuit board, the reflective sheet having at least one hole corresponding to the at least one light emitting diode, and a bottom frame arranged under the printed circuit board, wherein the at least one light emitting diode is exposed through the hole, wherein the plurality of light emitting diode units are spaced apart and are electrically connected to each other via at least one line extending from the printed circuit board, the at least one line is bent toward the bottom frame.

In another aspect, the liquid crystal display module includes a backlight assembly including a plurality of light emitting diode units, each of the plurality of light emitting diode units including at least one light emitting diode and a printed circuit board mounting the at least one light emitting diode; and a reflective sheet on the printed circuit board, the reflective sheet having at least one hole corresponding the at least one light emitting diode, wherein the at least one light emitting diode is exposed through the hole, wherein the plurality of light emitting diode units are spaced apart and are electrically connected to each other using at least one line extending from the printed circuit board, a bottom frame under the backlight assembly, a liquid crystal panel disposed over the backlight assembly, a main frame surrounding the liquid crystal panel and the backlight assembly, and a top frame surrounding a front edge of the liquid crystal panel, wherein the at least one line is bent toward the bottom frame.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 4A and 4B are schematic views showing a connection structure of LED units according to an exemplary embodiment of the present invention, in which FIG. 4A is an exploded perspective view and FIG. 4B is a cross-sectional view;

DETAILED DESCRIPTION OF THE PREFERRED EMBODIMENTS

Reference will now be made in detail to the preferred embodiments of the present invention, examples of which are illustrated in the accompanying drawings.

Figure 1:
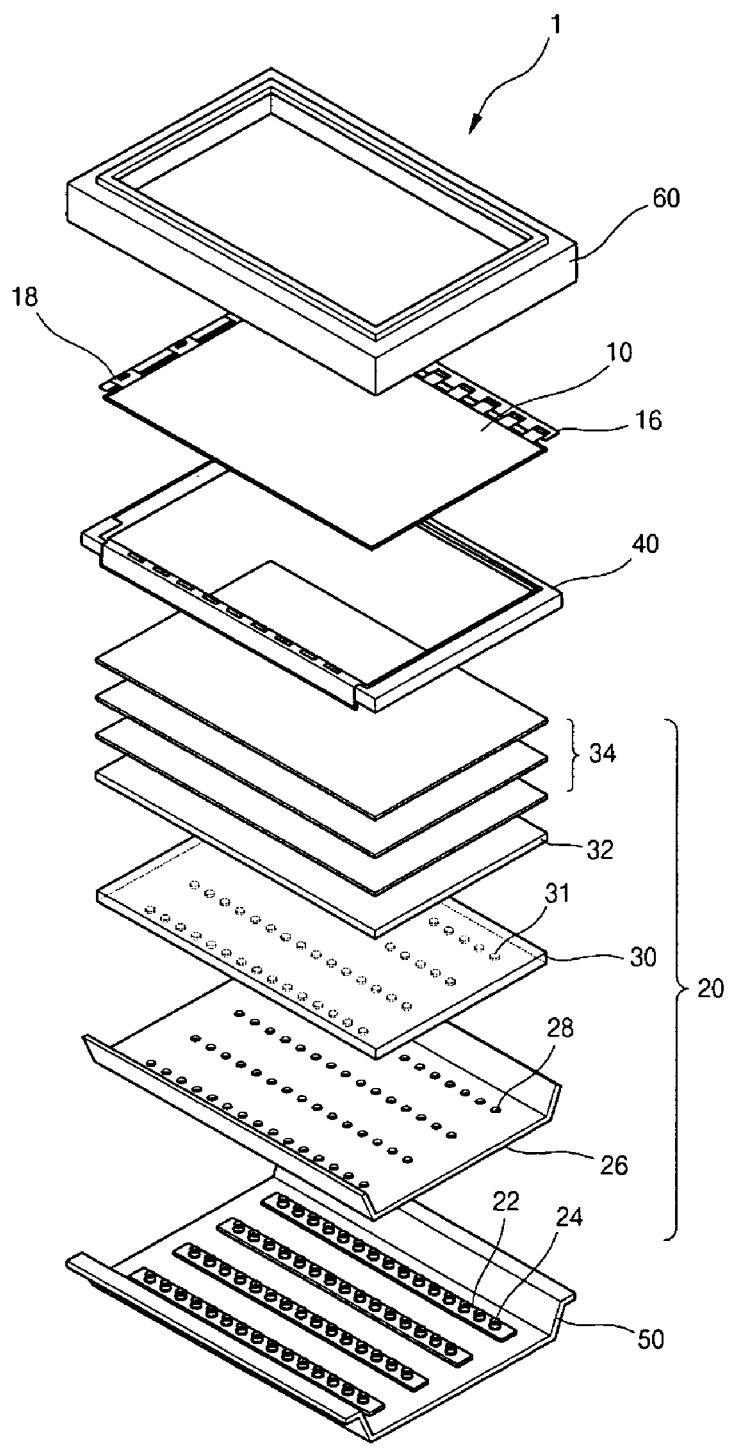
FIG. 1 is a schematic exploded perspective view of an LCD module according to the related art.
Figure 2:
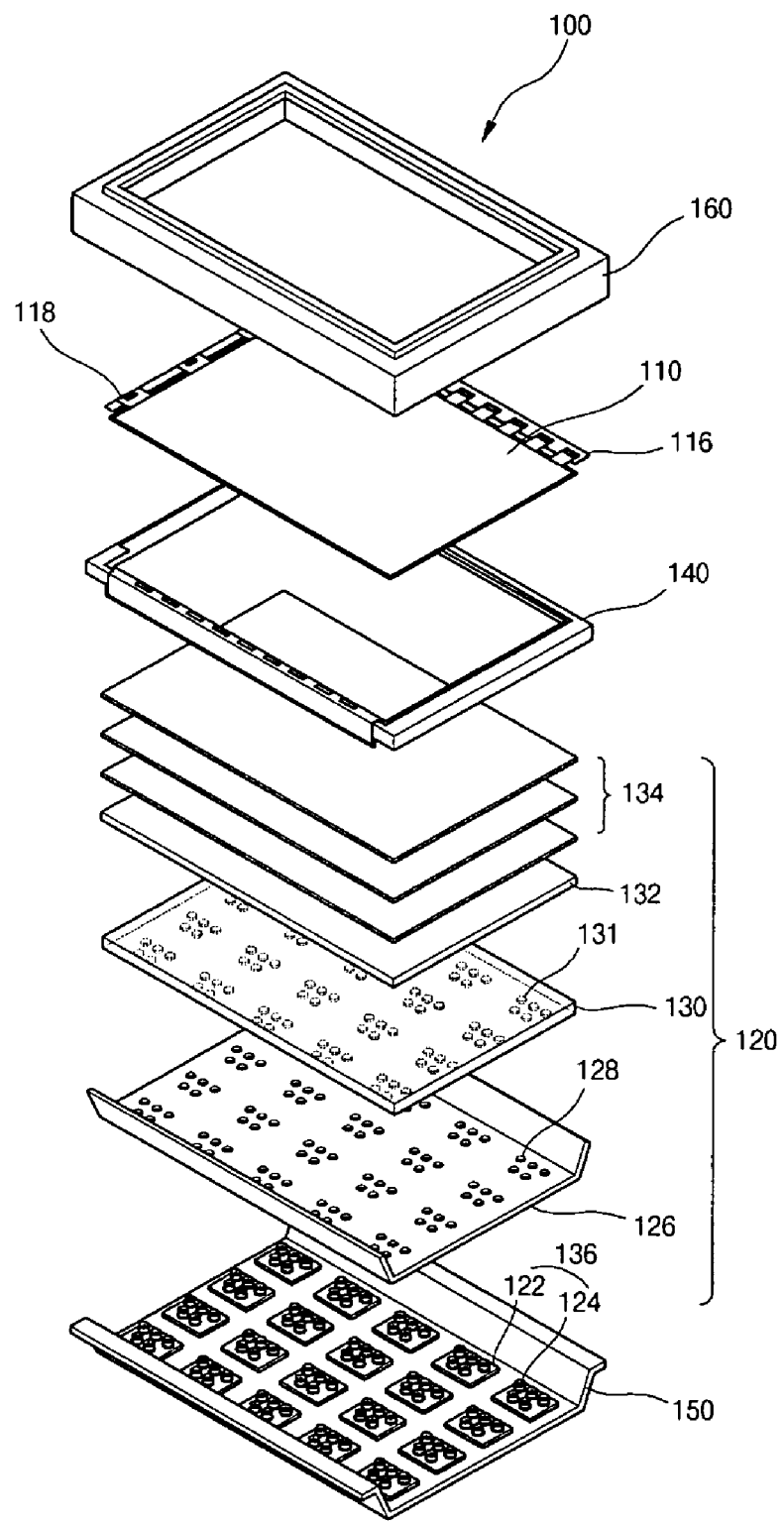
FIG. 2 is a schematic exploded perspective view of an LCD module according to an exemplary embodiment of the present invention.

FIG. 2 is a schematic exploded perspective view of an LCD module 100 according to an exemplary embodiment of the present invention. As shown in FIG. 2, the LCD module 100 includes a LCD panel 110 that includes two substrates (not shown) and a liquid crystal layer (not shown) interposed between the two substrates, a backlight assembly 120, a main frame 140 surrounding edges of the LCD panel 110 and the backlight assembly 120, a bottom frame 150 covering a backside of the backlight assembly 120 and combined with the main frame 140, and a top frame 160 surrounding the LCD panel 110 and combined with the main frame 140. In this exemplary embodiment, the main frame 140 and the top frame 160 have square shapes, respectively.

A gate PCB 118 and a source PCB 116 are disposed at the edges of the LCD panel 110, respectively. Here, the gate PCB 118 and the source PCB 116 are connected to the LCD panel 110 through a flexible circuit board (not shown). Moreover, the gate PCB 118 and the source PCB 116 are folded toward a side or a backside of the bottom frame 150 during a modulation process of the LCD module 100 to thereby be close to the LCD panel 110. Although not shown, the gate PCB 118 scans and applies ON/OFF signals of a thin film transistor to the plurality of gate lines, whereas the source PCB 116 applies image signals to the plurality of data lines.

The backlight assembly 120 is disposed under the LCD panel 110 as a light source. A plurality of PCBs 122 are disposed in a matrix on an inner surface of the bottom frame 150. On each PCB 122, a plurality of LEDs 124 emitting a predetermined color are mounted. In this exemplary embodiment, the LEDs 124 are arranged in a pattern and emit light toward the LCD panel 110. As shown in FIG. 2 for example, one PCB 122 and some LEDs 124 on the PCB 122 are defined as one LED unit 136. Moreover, if one LED 124 is able to emit the predetermined color, the LED unit 136 may include only one LED 124.

The backlight assembly 120 also includes a reflective sheet 126 disposed on the LED units 136. The reflective sheet 126 is formed with a plurality of holes 128 corresponding to the respective LEDs 124. Each LED 124 passes through the corresponding hole 128, thereby being exposed from the reflective sheet 126. As an example, the reflective sheet 126 may be selected from a white colored sheet or a silver colored sheet. Moreover, a transparent window 130 is disposed on the reflective sheet 126, a diffusion plate 132 is disposed on the transparent window 130 to realize uniform brightness, and an optical sheet group 134 is disposed on the diffusion plate 132. Although not shown, the optical sheet group 134 may include at least a reflective type polarizing sheet, a light concentrating sheet and a diffusion sheet.

As described above, the LED unit 136 includes at least one LED 124 emitting a predetermined color and the PCB 122 on which the at least one LED 124 is mounted. For example, the at least one LED 124 may emit white light as the predetermined color by uniformly mixing of the emitted light. Specifically, the LED 124 may emit light using LED chips. Accordingly, the plurality of LED units 136 are divided into individual LED units 136, each of which may be driven as an independent unit. Therefore, when some LEDs 124 are found defective on one LED unit 136, only the LED unit 136 having the defective LEDs 124 is selectively repaired or changed by repairing the defective LED unit 136 or replacing the defective LED unit 136 with a new LED unit, thereby reducing time and costs of repairing and exchanging the defective LEDs. For example, one LED 124 may include any one of red, green and blue LED chips, and is disposed using a cluster arrangement instead of one LED 124 including red, green and blue LED chips. Alternatively, the LED 124 may include one LED chip emitting a white color, or may include a plurality of LED chips emitting red, green, blue and white colors, respectively. The LED unit 136 may have the plurality of LEDs 124 arranged in a single row or in plural rows on the PCB 122. Accordingly, light from the LED unit 136 is emitted directly or by the reflective sheet 126. Then it is modified into a uniform plan light by passing through the transparent window 130, the diffusion plate 132, and the optical sheet group 134. Thus, an image having a desired brightness can be displayed in the LCD panel 110.

As explained above, the LED unit 136 may be operated by the backlight driving circuit, which may be disposed at a backside of the bottom frame 150, thereby minimizing the size of the backlight driving circuit. Accordingly, the LED units 136 are connected to the backlight driving circuit with an interconnected state. For this exemplary structure, at least one line (not shown) is formed from the PCB 122 with respect to one LED unit 136. The at least one line of the PCB 122 is connected to a thin film line (not shown) for electrically connecting the at least one line and the plurality of LEDs 124 by soldering for example. The connection structure of the LED unit is explained below using several exemplary embodiments.

Figure 3:
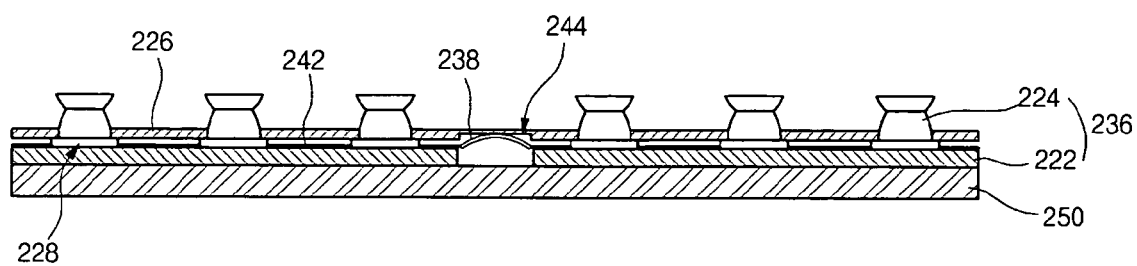
FIG. 3 is a schematic cross-sectional view illustrating a connection structure of an LED unit according to an exemplary embodiment of the present invention.

FIG. 3 is a schematic cross-sectional view illustrating a connection structure of an LED unit 236 according to an exemplary embodiment of the present invention. As shown in FIG. 3, the LED unit 236 includes a PCB 222 and a plurality of LEDs 224 mounted on the PCB 222 in a row. The LED unit 236 is spaced apart from an adjacent LED unit 236 on the bottom frame 250.

In this exemplary embodiment, a thin film line 242 is formed on the PCB 222 of the LED unit 236 and serves as electric interconnection means for the LEDs 224. A line 238 may be connected to an end portion of the thin film line 242 by soldering for example. The adjacent LED units 236 are interconnected by the line 238. Here, since the line 238 is connected to the thin film line 242 by soldering at the top surface of the PCB 222, the line 238 is bent toward a reflective sheet 226. Accordingly, a portion of the reflective sheet 226 corresponding to a space between the adjacent LED units 236 has a concave portion 244 to prevent the reflective sheet 226 from contacting the line 238. That is, the reflective sheet 226 includes the concave portion 244 so that a projected portion of the line 238 is not pressed by the reflective sheet 226.

Figure 4A:
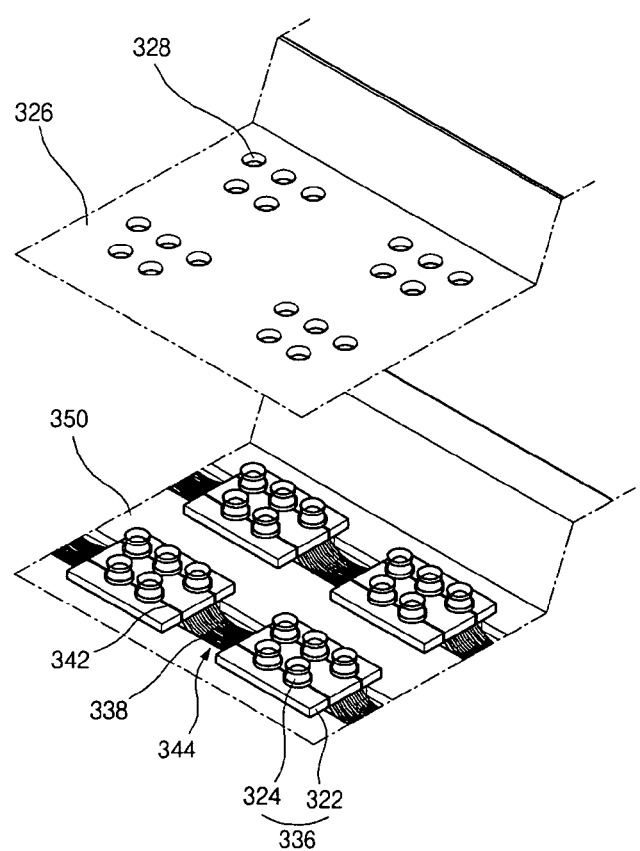
Figure 4B:
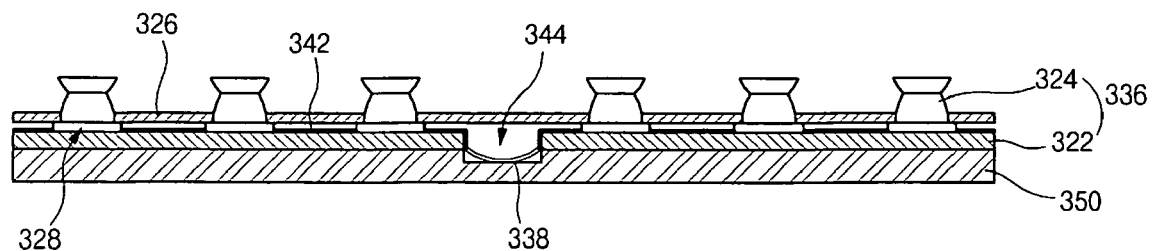

FIGS. 4A and 4B are schematic views showing a connection structure of LED units according to another exemplary embodiment of the present invention. FIG. 4A is an exploded perspective view, whereas FIG. 4B is a cross-sectional view. As shown in FIGS. 4A and 4B, a thin film line 342 is formed on the PCB 322 of the LED unit 336 and applies an electric signal to the LED units that are arranged in a row. Further, a line 338 is connected to the thin film line 342 at an end portion of the thin film line 342 by soldering method for example. Moreover, the LED units 336 are interconnected by the line 338.

In this exemplary embodiment, the line 338 connecting the LED units 336 is bent toward the bottom frame 350. In other words, with respect to the bottom frame 350, the line 338 is projected toward the bottom direction. Further, the thin film line 342 is bent toward the bottom direction along a side of the PCB 322 from an edge of the PCB 322. Due to the structural modification of the thin film line 342, the line 338 is disposed at a bottom position of the PCB 322 and is bent toward the bottom frame 350. Here, the bottom frame 350 has a concave portion 344 toward the projected portion of the line 338 to prevent the line 338 from being pressed against the bottom frame 350.

Figure 5A:
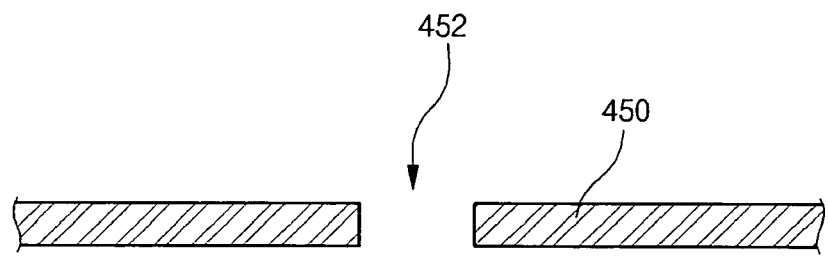
FIG. 5A is a schematic cross-sectional view showing a bottom frame having a hole according to an exemplary embodiment of the present invention.
Figure 5B:
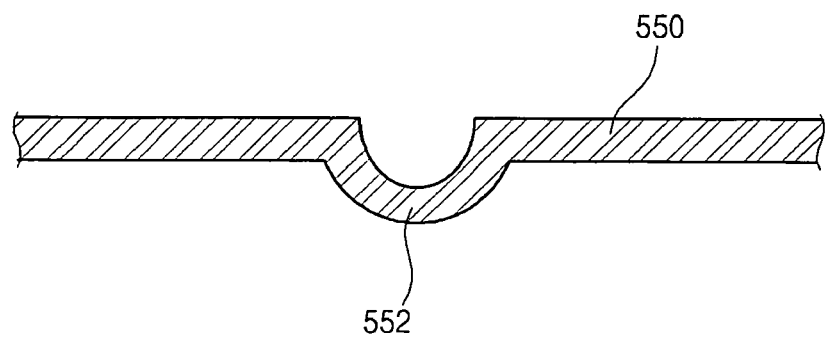
FIG. 5B is a schematic cross-sectional view showing a bottom frame having an embossed pattern according to an exemplary embodiment of the present invention.

FIG. 5A is a schematic cross-sectional view showing a bottom frame 450 having a hole according to an exemplary embodiment of the present invention. FIG. 5B is a schematic cross-sectional view showing a bottom frame 550 having an embossed pattern according to another exemplary embodiment of the present invention. As shown in FIG. 5A, the bottom frame 450 may include a hole 452 corresponding to the projected portion of the line 338 (of FIGS. 4A and 4B). The hole 452 may be formed, for example, by punching in the bottom frame 450 as shown in FIG. 5A. Alternatively, as shown in FIG. 5B, the bottom frame 550 may include an embossed pattern 552 corresponding to the projected portion of the line 338 (of FIGS. 4A and 4B). In other words, the bottom frame 550 has a convex portion toward the backside thereof, such as the embossed pattern 552.

Accordingly, the plurality of LED units 336 may be disposed on the bottom frame 350, 450 or 550 and be interconnected by the line 338. The reflective sheet 326 is disposed on the PCB 322 and the bottom frame 350, 450 or 550 and exposes the plurality of LEDs 324 using the plurality of holes in the reflective sheet 326. For example, the PCB 322 may include a metal core PCB so that resistant heat is dissipated quickly when the LEDs 324 are activated.

As explained above, according to the present invention, additional modification process for the reflective sheet is unnecessary, thereby improving brightness, color uniformity and preventing color spots. Moreover, because the backlight assembly of the present invention includes a plurality of LED units that are individual LED units, only damaged individual LED unit may be repaired or changed without replacing the entirety of the LED units. Therefore, productivity can be improved and production costs can be reduced. Further, the line between the LED units adjacent to each other is bent toward the bottom frame and is projected away from the reflective sheet, thereby removing the additional modification process of the reflective sheet. Consequently, brightness and color uniformity can be improved and color spots can be prevented.

It will be apparent to those skilled in the art that various modifications and variations can be made in a backlight assembly and a liquid crystal display module using the same of the present invention without departing from the spirit or scope of the invention. Thus, it is intended that the present invention cover the modifications and variations of this invention provided they come within the scope of the appended claims and their equivalents.

What is claimed is:

1. A backlight assembly, comprising:
  a plurality of light emitting diode units,
  each of the plurality of light emitting diode units including at least one light emitting diode, and a printed circuit board on which the at least one light emitting diode is mounted;
  a reflective sheet on the printed circuit board, the reflective sheet including at least one hole corresponding to the at least one light emitting diode, such that the at least one light emitting diode is exposed through the at least one hole; and
  a bottom frame arranged under the printed circuit board;
  wherein the plurality of light emitting diode units are spaced apart and are electrically connected to each other via at least one line extending from the printed circuit board, the at least one line being bent toward the bottom frame, and
  wherein the bottom frame has a concave portion accommodating a bent portion of the at least one line.

2. The assembly according to claim 1, wherein the concave portion includes a depth that is less than a thickness of the bottom frame.

3. The assembly according to claim 1, wherein the concave portion includes an opening corresponding to the bent portion of the at least one line.

4. The assembly according to claim 1, wherein the concave portion includes an embossed pattern corresponding to a shape of the bent line.

5. The assembly according to claim 1, further comprising a transparent window including at least one diverter corresponding to the at least one light emitting diode, the transparent window being disposed on the reflective sheet.

6. The assembly according to claim 5, further comprising an optical sheet group arranged on the transparent window.

7. The assembly according to claim 1, further comprising a backlight driving circuit controlling an operation of the plurality of the light emitting diode units.

8. The assembly according to claim 1, further comprising a thin film line arranged on the printed circuit board, the thin film line connecting the at least one light emitting diode and the at least one line.

9. The assembly according to claim 8, wherein the thin film line is bent toward the bottom frame.

10. The assembly according to claim 8, wherein the at least one line is connected to an end portion of the thin film line by soldering.

11. The assembly according to claim 8, wherein the at least one light emitting diode receives a signal through the thin film line.

12. The assembly according to claim 1, wherein the at least one light emitting diode emits a white light.

13. The assembly according to claim 12, wherein the at least one light emitting diode includes at least one red, at least one green and at least one blue light emitting diode chips that emit the white light by mixing colors.

14. The assembly according to claim 13, wherein the at least one red, at least one green and at least one blue light emitting diode chips are disposed in a pattern on the printed circuit board.

15. A liquid crystal display module, comprising:
a backlight assembly, the backlight assembly including:
a plurality of light emitting diode units, each of the plurality of light emitting diode units including at least one light emitting diode and a printed circuit board on which the at least one light emitting diode is mounted; and
a reflective sheet on the printed circuit board, the reflective sheet including at least one hole corresponding to the at least one light emitting diode, such that the at least one light emitting diode is exposed through the at least one hole,
wherein the plurality of light emitting diode units are spaced apart and are electrically connected to each other using at least one line extending from the printed circuit board;
a bottom frame arranged under the backlight assembly;
a liquid crystal panel disposed over the backlight assembly;
a main frame surrounding the liquid crystal panel and the backlight assembly; and
a top frame surrounding the liquid crystal panel,
wherein the at least one line is bent toward the bottom frame, and
wherein the bottom frame has a concave portion accommodating a bent portion of the at least one line.

* * * * *